Jan. 12, 1960  R. L. INGRAM  2,920,434
FLEXIBLE GANG MOWING MACHINE
Filed Dec. 23, 1957                                        2 Sheets-Sheet 1

INVENTOR
RICHARD L. INGRAM

BY
ATTORNEYS

Jan. 12, 1960 R. L. INGRAM 2,920,434
FLEXIBLE GANG MOWING MACHINE
Filed Dec. 23, 1957 2 Sheets-Sheet 2

INVENTOR
RICHARD L. INGRAM

BY
ATTORNEYS

United States Patent Office

2,920,434
Patented Jan. 12, 1960

2,920,434

FLEXIBLE GANG MOWING MACHINE

Richard L. Ingram, Barwick, Ga.

Application December 23, 1957, Serial No. 704,694

1 Claim. (Cl. 56—25.4)

The present invention relates to a multiple unit lawn mower and, more particularly, to a new and improved flexible gang mowing machine.

An important object is to provide a simple, efficient and economical gang mower which includes a plurality of units arranged in rows disposed transversely and longitudinally of the machine, and in which the units in each transverse row are laterally offset from adjacent units in the rows in front and to the rear thereof.

A further object consists in providing a multiple unit lawn mower including a front row of transversely laterally spaced units and at least one rear row, each rear row having more transverse units than its adjacent front row, so that the end units of the rear row extend outwardly and laterally beyond the end units of the adjacent front row. The end units of each rear row being hingedly connected to intermediate units in the same row so that each outermost end unit may swing inwardly and be disposed in longitudinal alignment with an adjacent unit of the front row so as to permit the use of the mowing machine in narrow or restricted areas. The mowing or cutting units with the exception of the two outside units are interchangeable.

Another object consists in mounting each of the mowing units on a pair of transversely spaced skids or runners that extend forwardly from the rear end of each unit to a middle or central point so as to provide means to permit each of the blades to cut the grass ahead of the skids without pressing down the grass by these skids before it is cut.

Another object consists in providing a flexible mowing machine including a plurality of mowing units which are hingedly connected to longitudinally disposed shaped members or bars and are arranged in rows including a front row and one or more rear rows and in which the front row is formed of a less number of units than the rear row so as to provide a flexible connection of each unit to the machine in order that cutting means are provided for mowing grass or hillsides, terraces, furrows, roadways, ditches and the like. Additionally, the end units of the rear row each has a curved or rounded corner.

A still further object is to provide each of the units of the flexible gang mower with a cutting blade rotatably mounted on the unit about a vertical axis and arranged to overlap an adjacent blade so as to insure the blades covering the entire area over which the machine passes irrespective of the contour or irregularity of the terrain.

Other objects and advantages will become apparent from the following description when taken in conjunction with the following claim and drawings:

Referring to the drawings:

Figure 1 is a plan view showing a flexible gang mowing machine constructed in accordance with the present invention and connected to the rear of a farm vehicle such as a tractor or the like;

Figure 2:
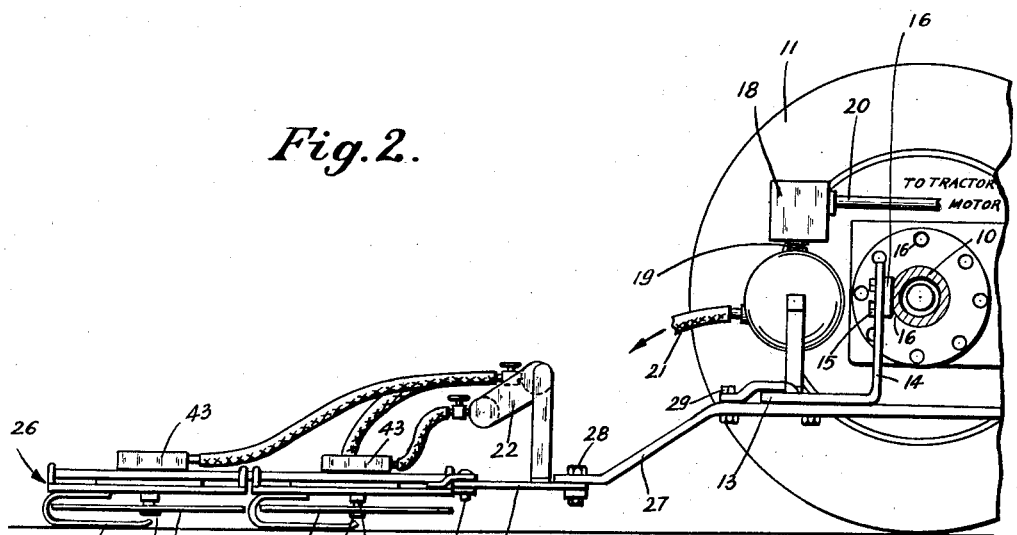
Figure 2 is a side-elevational view of Figure 1.
Figure 1:
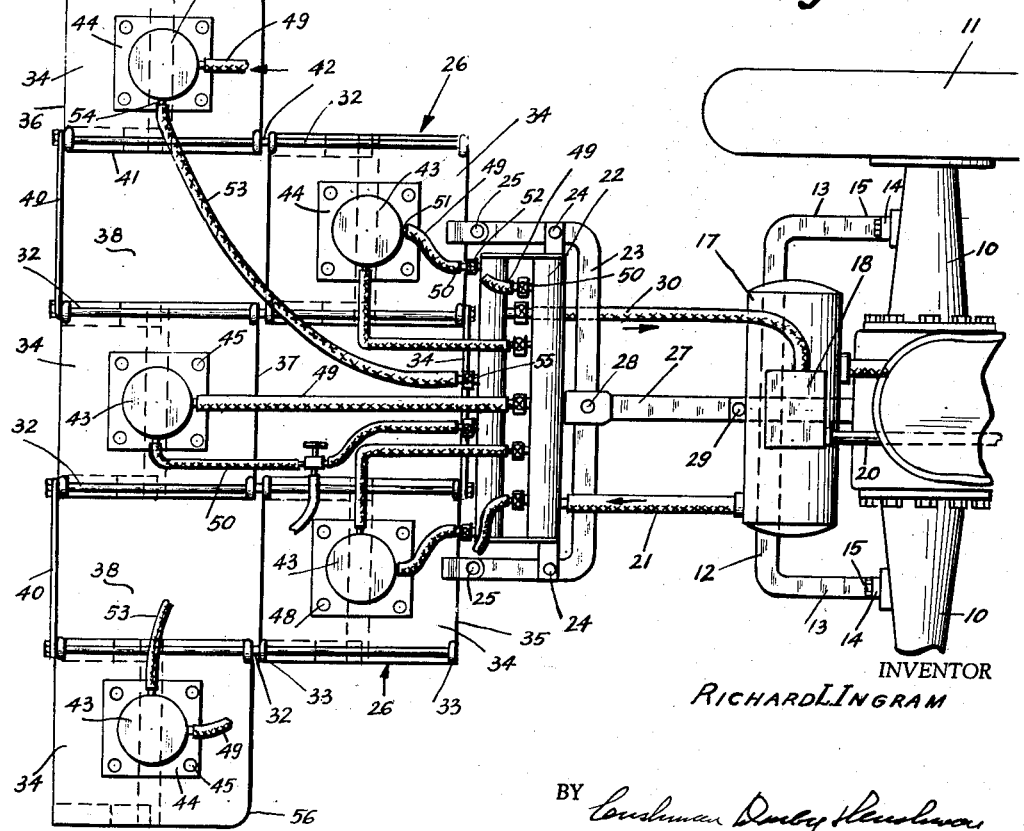

Referring to the drawings, 10 indicates the rear axle housing of a power-operated vehicle such as a farm tractor or the like, and 11 the rear wheels thereof. A supporting frame having a transverse arm 12 and spaced horizontally disposed parallel arms 13 which terminate in upwardly extending arms 14, may be detachably connected to the tractor, by the retaining bolts 15. The bolts 15 extend through suitable openings in the vertical arms 14 and are connected to a transverse bar or plate 16, that is welded as at 16' to the rear axle housing 10 (Fig. 2). A tank or reservoir 17 is connected to the horizontal arm 12 of the frame so as to be maintained in a fixed position on the rear of the tractor. A heavy duty hydraulic pump 18 may be positioned above the tank 17 and has a vertically disposed shaft 19 extending into the tank. An operating shaft which is connected to the tractor of the motor (not shown), extends into the pump 18 to provide means for forcing the fluid such as air in the reservoir 17, through a flexible conduit 21 and into a manifold or container 22 mounted on the arms of a U-shape hitch bar 23 as at 24. The hitch bar 23, in turn, is connected as at 25, to the flexible gang mowing machine or attachment generally indicated by the numeral 26 (Fig. 1). The hitch bar 23 may be detachably connected to the arm 12 of the tractor frame by a draw-bar 27 pivotally connected at one end as at 28 to the bar 23, and at its opposite end as at 29, to the frame of the tractor. The manifold or tank 22 has a flexible outlet conduit 30 for returning the fluid introduced into the manifold 22 to the pump 18.

The flexible gang mowing machine or attachment 26 includes longitudinally extending uniformly spaced rods or bars 32, to which are connected spaced upwardly extending pairs of lugs or ears 33 on each of the mowing units 34, so that these units are hingedly connected to the rods in order that when the machine is in operation, each unit will automatically adjust itself to the irregularity of the terrain or ground over which the lawn mower is being moved. The units 34 are preferably of substantially square shape and are arranged in transverse and longitudinally disposed rows, which include a front row indicated by the numeral 35 and at least one rear row 36 (Fig. 1), containing a larger number of units than the front row. Each of the rows 35 and 36 is formed of a plurality of uniformly spaced units in which the units in each row 35, is spaced from an adjacent unit in the same row, substantially the width of the unit and is laterally offset from an adjacent unit in the next or rear row 36. Thus, it will be seen any number of units— three, five or more—may be used. Moreover, the units in the longitudinally disposed rows are staggered or offset relative to adjacent units in a transverse row. For the purpose of illustration, a five-unit mower is shown having two transverse front units 35 and three transverse rear units 36.

Figure 3:
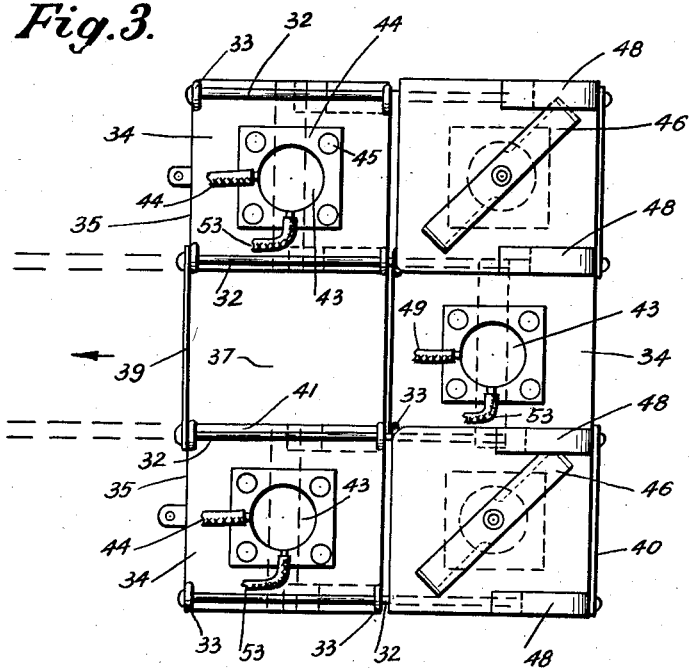
Figure 3 is a detailed plan view of the multiple unit lawn mowing machine showing the outer end units of the rear row folded to their overlapping position on the machine.

The space between each of the adjacent front units 34 is indicated by the numeral 37, while the spaces between the three rear units is indicated by the numeral 38 (Fig. 1). A transverse reinforcing rod or link 39 extends across each space 37 and is connected at its opposite ends to adjacent longitudinal rods 32 (Fig. 3). Similar rods 40 extend transversely of the spaces 38 between the rear row of units 36 so as to be connected to adjacent longitudinal rods 32 in substantially the same manner as the rods 39. Thus, it will be seen that the rods 39 and 40 coact with adjacent units to provide a uniform flexible assembly. Each of the mowing units 34 is of such a width as to extend slightly beyond its adjacent longitudinal rod 32, so as to provide a marginal edge portion 41 at opposite sides thereof which overlaps the adjacent edge as at 42 (Fig. 1), of an adjacent unit 34 of a rear row, for a purpose subsequently to be described.

Figure 4:
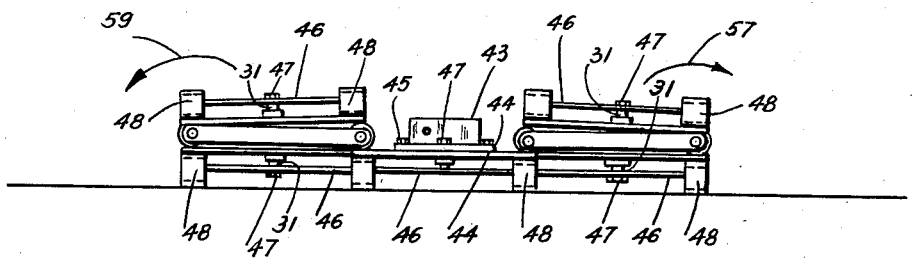
Figure 4 is a longitudinal side-elevational view of Figure 3.

Each of the mowing or cutter units 34 has a central opening over which is mounted a motor housing 43 having a square plate or flange 44, which is connected to the top of each of the units 34 in any suitable manner such as by the bolts 45 (Fig. 4). Rotatably mounted within each of the housings 43, and extending outwardly therefrom, is a vertically disposed rotary operating shaft 31 to which is fixedly connected a horizontal cutter blade 46 by the clamping nut 47 for rotating the blade about a vertical axis. Each of the blades 46 is of substantially the same length as the square mowing units 34, so that the blade in each unit 34 of the front row 35 will overlap a blade in the adjacent offset rear unit 36 during the operation of the machine, thus providing means for insuring the adjacent blades in each transverse row overlapping the adjacent blades in the next transverse row so as to thoroughly cover all of the ground and the efficient cutting of the grass when the machine is operating on a smooth even surface or over uneven terrain.

Each of the units 34 is mounted on a pair of transversely spaced skids or runners 48, which extend from the rear thereof forwardly to a point substantially centrally or intermediate the length of each unit, in order to permit each blade 46 to cut the grass ahead of the skids without danger of this grass being first mashed down by the skids before it is cut. Each of the blades is powered or rotated by individual hydraulic fluid motors mounted within each of the housings 43. A plurality of flexible tubular members are each connected at one end as at 50 to the manifold 22 and at its opposite end to an inlet nipple 51 of the motor housing 43 so as to cause rotation of its associated blade 46 during the operation of the mowing machine. A valve 52 is associated with each of the flexible members or conduits 49 so as to control the flow of the fluid pressure from the manifold 22 into each of the motor housings 43. Similarly, associated with each of the motor housings 43 is a flexible tubular member or conduit 53, which is connected at one end as at 54 to an outlet nipple on the housing 43 and at its opposite end communicates through a control valve 55 with the manifold 22. Each of the outside cutting units 34 of the rear row 36 has its front corner portion curved or rounded as at 56 (Fig. 1) so as to enable the cutting blades to efficiently operate close to walls or fences.

In operation, assuming that all the rows of the mowing units are in their open operative position as shown in Figure 1, and the valves 52 are open so as to allow the fluid under pressure from the tank or reservoir 17 to flow through the pipe 21 into the manifold 22 and be delivered into each of the motor housings 43, it will be seen that upon moving of the tractor over the ground, the mowing machine or attachment is towed so as to cover a substantial area and insure the uniform cutting of the grass due to the flexible connection of each of the units with the machine. Moreover, due to the cutting blades 46 and the front row 35 overlapping the adjacent blades in the rear row 36, the blade will uniformly cut all the grass over which they pass, irrespective of whether the ground is smooth or uneven. Since the skids 48 extend from the rear of each of the units and the blades 46 project outwardly therefrom (Fig. 2), there is no danger of the skids mashing down the grass before it is cut by the blades. When the cutting operation is completed, the valves 52 are turned off and the valves 55 are opened so as to allow the fluid pressure in the housing 43 to escape in the pipe 53 into the manifold 22 and through the exhaust conduit 30 back into the pump 18 (Fig. 1).

It will be seen that by reason of the individual hinged connection of each of the mowing units 34 with the spaced rods 32 that the flexibility of the machine insures mowing of grass on uneven terrain. Moreover, when it is desired to cut the grass in a narrow restricted area, each of the outermost units 34 on the rear row 36 may be moved about its hinged connection with a rod 32 to overlap an adjacent space 38 (Fig. 4) and be returned to its normal outermost position by being swung in the direction of the arrows 57 (Fig. 4). The hinged units 34 may be folded so as to overlap adjacent spaces, such as 37 and 38, in order that the flexible gang mowing machine may assume a compact shape and thus be economically shipped or transported from place to place and at a minimum expenditure of time and effort. The control valves 52 and 55 of the outermost units 34 of course have been previously moved to their closed position. The inner units which at their opposite sides are connected by the lugs 33 to adjacent rods 32 are interchangeable, and the outermost units connected to the rear row 36, each have only one side hingedly connected to a rod 32, while its opposite side is free and is provided with a front curved corner 56 to allow the machine to cut close to walls or areas of the ground which might not otherwise be reached by the blades 46.

It will be understood that the form of the invention shown is merely illustrative of a preferred embodiment and that such changes may be met as fall within the purview of the following claim.

I claim:

A flexible gang mowing machine including spaced longitudinally extending rods, mowing units hingedly connected to said rods and extending transversely thereof, each of said units having cutter blades rotatably mounted thereon about a vertical axis, said units being of substantially the same uniform size and shape and arranged in transverse rows, said rows including a front row and at least one rear row, each rear row having more units than its adjacent front row so that the end units in each rear row extend laterally beyond the end units of the adjacent front row, so as to be swung inwardly and overlap an adjacent space of the row in which it is positioned, the units in each transverse row being separated from adjacent units in the same row to provide a space of substantially the same size and shape as the units, said units being laterally offset from adjacent units in the next row so that each unit may be folded and overlap an adjacent space in the same transverse row in order that the mowing machine may assume a compact shape, and means operatively connected to said blades for rotating the same.

References Cited in the file of this patent

UNITED STATES PATENTS

| 1,693,475 | Clapper | Nov. 27, 1928 |
| 1,849,941 | Lofstrand | Mar. 15, 1932 |
| 2,134,115 | Flammang | Oct. 25, 1938 |
| 2,167,222 | Shelor | July 25, 1939 |
| 2,724,229 | Graham | Nov. 22, 1955 |
| 2,743,567 | Martin | May 1, 1956 |
| 2,816,410 | Nobles | Dec. 17, 1957 |